United States Patent Office 3,723,391
Patented Mar. 27, 1973

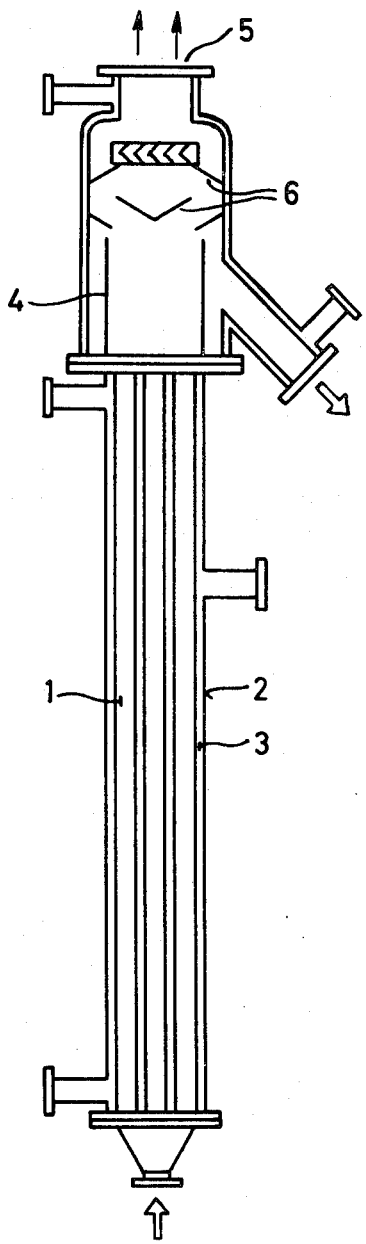

3,723,391
CONTINUOUS MANUFACTURE OF POLYESTERS
Ludwig Beer, Ludwigshafen, and Hermann Fischer and Eduard Heil, Limburgerhof, Germany, assignors to Badische Anilin- & Soda-Fabrik Aktiengesellschaft, Ludwigshafen (Rhine), Germany
Filed Nov. 18, 1970, Ser. No. 90,574
Claims priority, application Germany, Nov. 22, 1969, P 19 58 777.0
Int. Cl. C08g 17/01
U.S. Cl. 260—75 M        10 Claims

ABSTRACT OF THE DISCLOSURE

A process for the continuous manufacture of linear polyesters having an intrinsic viscosity of up to 0.40 by polycondensing diglycol terephthalate and/or its precondensates in a bundle of tubes at elevated temperature and reduced pressure. The linear polyesters thus obtained are suitable for film and fiber production.

---

This invention relates to the continuous manufacture of linear polyesters having an intrinsic viscosity of up to 0.40.

It is well known that polyesters may be obtained by reacting aromatic dicarboxylic acids or dicarboxylic acid esters with aliphatic glycols. This reaction, which takes place with the elimination of volatile components such as glycol and water, is carried out on an industrial scale usually in two or more stages.

If, for example, dimethyl terephthalate is used as the starting component, this is first transesterified with ethylene glycol to form diglycol terephthalate or its oligomeric condensation products. The transesterification product is then converted batchwise or continuously in suitable reactors, for example in stirred kettles or cascades of stirred kettles, with the elimination of glycol to form a precondensate having a low molecular weight. This precondensate is finally condensed up to the desired viscosity in special equipment capable of dealing with the high viscosity of the final products, for example reactors fitted with screw stirrers and connected to a vacuum. In most cases, however, this method of conducting the reaction calls for a relatively long condensation period, generally of several hours. The continuous procedure has advantages such as better control of larger production units and the production of a substantially more uniform product. The reaction rate is dependent not only on the position of the point of equilibrium and the speed at which it is reached but also, to a considerable degree, on the surface area of the product available for the evaporation of the volatile elimination product, the efficiency of any stirring equipment used, the type of heat transfer existing between the heating medium and the reaction mixture, the conduction of heat within the mixture and the diffusion of the eliminated glycol at the surface.

U.S. Patent 3,192,184 describes a method of producing linear polyesters by flowing diglycol terephthalate as a thin film down specially constructed surfaces provided with protuberances such as spiral ridges or fins and removing the vaporous by-product evolved in a stream flowing countercurrent to the direction of flow of the polycondensate. This method of polycondensation is unsatisfactory, since the specially constructed surface having protuberances are expensive to make and, moreover, the degree of self-cleaning of the apparatus is inadequate due to the non-smooth surfaces therein, giving rise to the risk of decomposition of deposited reaction products due to continued heating thereof. Furthermore, the removal of the vaporous by-products counter-currently to the polycondensate leads to fairly high losses of terephthalic acid, since the glycol entrains diglycol terephthalate or its oligomers before these have been able to polycondense to high molecular weight non-volatile products. This loss can be overcome by the use of additional and expensive rectifying columns.

The literature also discloses methods of carrying out continuous polycondensations in cascades of stirred kettles. This procedure also has a number of serious disadvantages. For reasons similar to those mentioned in connection with the above process, this procedure also involves fairly high losses of terephthalic acid if not reduced by additional equipment. Apart from the expense involved in carrying out these steps in a number of individual reactors, there is the added risk of the stirrer sealing glands becoming leaky in the course of time and the consequent inlet of air leading to an impairment of the quality of the polester product. In the case of large production units there is the additional problem of transferring to the reaction mixture the large amount of heat necessary for evaporating the glycol whilst ensuring that the said heat transfer is sufficiently rapid not to make it the controlling factor in determining the rate of the entire process. This requirement is difficult to satisfy in the case of stirred kettles, since the heat transfer takes place exclusively via the kettle walls unless additional heat transfer elements are included within the kettle, which in turn increases the apparatus costs.

It is an object of the invention to provide a continuous process for the manufacture of linear polyesters involving the use of simple equipment not requiring any moving parts which would be liable to considerable wear.

It is another object of the invention to minimize the losses of terephthalic acid by simple means.

It is yet another object of the invention to provide a process affording good self-cleaning of the equipment such that no thermal decomposition takes place due to long residence times of deposited product.

Yet another object of the invention is to provide a process making it possible to transfer large quantities of heat to the reaction mixture in a short time by technically simple means and thus to minimize the residence times of the reaction mixture in the reaction chamber.

These and other objects are achieved by a process for the continuous manufacture of linear polyesters containing at least 80% by weight of ethylene glycol terephthalate units and having an intrinsic viscosity of up to 0.40 by polycondensing diglycol terephthalate or its precondensates having an intrinsic viscosity of up to 0.30, which comprises passing a reaction mixture of diglycol terephthalate or its precondensates having an intrinsic viscosity of up to 0.30 in the presence or absence of other usual polyester-forming components up through a bundle of stationary tubes heated to temperatures between 250° and 310° C. to a hold tank located immediately above the tubes at a pressure of from 0.1 to 600 mm. of Hg, wherein (a) at least 80% of the heating area required for heating the reaction mixture and evaporating the volatile portions thereof is provided by the inner surface of the tubes,
(b) agitation of the reaction mixture is effected by the bubbles of vapor formed, and
(c) the average residence time of the reaction mixture in the tubes and hold tank together is between 10 and 200 minutes.

The invention also relates to apparatus for carrying out the process which comprises (a) means for charging the reaction mixture to the bottom of the apparatus,
(b) means for evenly distributing the reaction mixture, (c) a bundle of stationary, substantially vertical tubes, the bundle being surrounded by a heating jacket for the accommodation of a heating medium, (d) a hold tank located immediately above the tubes and connected to a vacuum, and (e) means for discharging the polyethylene terephthalate formed.

In general, the starting material used is diglycol terephthalate such as is obtained in the transesterification of dialkyl terephthalates with glycol or in the direct esterification of terephthalic acid with glycol, in which cases the product is referred to as a transesterification product or an esterification product. Usually, this diglycol terephthalate contains, in addition to free glycol, oligomers formed with the elimination of glycol and having, on the average, a degree of polycondensation of less than 15. It is possible, however, to start from precondensates having an intrinsic viscosity of up to 0.30. In addition to the diglycol terephthalate or its precondensates, other usual polyester-forming components may be present. These may be, for example, aliphatic, cycloaliphatic or aromatic dicarboxylic acids having up to 14 carbon atoms, such as substituted terephthalic acids, phthalic acid, isophthalic acid, substituted isophthalic acids, 2,6-naphthalene-dioic acid, 4,4'-diphenyldioic acid, and aliphatic or cycloaliphatic glycols having up to 12 carbon atoms, such as propylene glycol, butylene glycol, neopentyl glycol, or 1,4-bis-hydroxymethyl-cyclohexane, and also sulfonated dicarboxylic acids, such as 5-sulfoisophthalic acid or glycols containing sulfonic acid groups.

These other polyester-forming components may be added in such quantities that the final polyester still contains at least 80% by weight of ethylene glycol terephthalate units. The compounds carrying sulfonate groups will, however, generally only be included in the polyester in an amount of up to 5% by weight. Polycondensation is carried out by passing the diglycol terephthalate and/or its precondensates in the molten state and at reduced pressure up through a bundle of stationary, heated tubes by means of suitable conveying equipment. At the same time, heat is applied to the transesterification mixture, this heat being necessary to heat the reaction mixture and evaporate the free glycol and the eliminated glycol which is liberated during polycondensation.

The static pressure of this liquid column also prevents the transesterification mixture arriving at the bottom of the tubes from being subjected to the full vacuum immediately. This creates a set of conditions in which the diglycol terephthalate which is also volatile and is present in large quantities is converted, at a relatively weak vacuum, at which the evaporation of diglycol terephthalate is not appreciable, to nonvolatile oligomeric condensation products, the reaction mixture then being subjected to an increasing vacuum as it rises through the tubes. In this way it is possible to keep down the terephthalic acid losses caused by the evaporation of diglycol terephthalate without it being necessary to use additional apparatus such as a separating column.

The mixture of vapor and liquid is then passed to a hold tank located immediately above the tubes. In this tank the vapor separates from the liquid and the reaction mixture may condense further before it is removed from the reactor by suitable discharge means. The vaporous portions are withdrawn via the vacuum applied to the tank and are then liquefied in suitable condensation equipment. The residence time of the reaction in the hold tank may be adjusted by simple means, for example by utilizing the level of the liquid reaction mixture therein. The desired degree of condensation may be adjusted by varying the residence time in relation to the throughput of the reaction mixture per unit of time. If the residence time in the hold tank is too short, the degree of condensation achieved may be inadequate, and if the residence time is too long, the quality of the product may be impaired. In general, the total residence time of the reaction mixture in the reactor, that is in the tubes and in the hold tank together, is between 10 and 200 minutes, preferably between 15 and 120 minutes. The most favorable residence time may be readily determined by simple experiment.

It is advantageous but not essential for the tubes to lead to a common hold tank.

The agitation effect produced by the bubbles of glycol vapor which rise in the reaction mixture within the tubes and in the hold tank produces good surface renewal in the reaction mixture. At the same time, the glycol vapor is substantially freed from diglycol terephthalate and oligomeric portions due to the washing effect of the supernatant liquid.

The major portion of the heat required to heat the reaction mixture and evaporate the volatile portions thereof is applied to the reaction mixture while it is passing through the tubes. Conveniently, at least 80% and preferably 90% of the required heating surface is formed by the inner surface of the tubes themselves. This ensures rapid transfer of heat to the reaction mixture, since the ratio of effective heating area to volume of reaction mixture is most favorable within the tubes. Any additional heat required may be applied by heating surfaces in the hold tank.

It is particularly advantageous for the entire transfer of heat to take place in the tubes, the hold tank being only sufficiently heated to maintain the temperature of the reaction mixture as achieved within the tubes.

The tubes are conveniently surrounded by a common heating jacket for the vaporous or liquid heating medium. Preferably the heating medium is one which is vaporous at the temperatures used, such as the eutectic mixture of diphenyl and diphenyl ether. The temperature of the heated tubes is generally about 10° C. above the desired reaction temperature. If the temperature is too high, the product will be injured thermally, and if it is too low, the degree of condensation achieved will be too low.

The overall length of the tubes influences, above all, the amount of terephthalic acid lost due to the evaporation of diglycol terephthalate and oligomers. The amount of lost acid decreases as the length increases. On the other hand, the condensation effect based on the average residence time of the product in the reactor may decrease with increasing length of the tubes so that there is an optimum range of tube lengths. This is generally between 2 and 10 meters, in particular between 3 and 7 meters. The inside diameter of the tubes is conveniently from 10 to 100 mm., advantageously from 20 to 60 mm. The cross-section of the tubes may be constant over their length.

The vacuum applied to the hold tank may be varied within wide limits. If it is too weak, the condensation effect is inadequate, and if it is too strong, one effect is an increase in the loss of terephthalic acid and another result is that the withdrawal of the large volumes of vapor presents increasing technical difficulties. In general, the vacuum is conveniently between 0.1 and 600 mm., preferably between 0.1 and 100 mm. of Hg. The optimum vacuum may be readily determined within the range given by simple experiment.

In an advantageous embodiment of the process, tubes are used which contain bottlenecks, for example tubes having a varying cross-section. The provision of bottlenecks in the reactor tubes improves the flow characteristics of the reaction mixture. Furthermore, the bottlenecks cause close contact between the vapor and liquid, this having a favorable effect on the washing action of the liquid contents of the tube in washing out the vaporous diglycol terephthalate portions. The bottlenecks may be formed in various manners, it is possible, for example, to insert orifice plates or capillaries. An embodiment which is highly efficient involves the use of squeezed tubes. The most simple way to make such tubes is to place ordinary round tubes in a press and to squeeze them so as to provide slot-like depressions using a suitable die.

As the number of bottlenecks is increased the condensation effect relative to the residence time of the product increases and the loss of terephthalic acid decreases. However, it is not advisable to increase the number of bottlenecks excessively, since beyond a certain optimum the condensation achieved relative to the throughput is reduced due to a reduction in the capacity of the reactor. In general, the optimum lies between 1 and 20 bottlenecks, preferably between 1 and 10 bottlenecks per tube. The length and width of the slot-like depressions influence, above all, the loss of terephthalic acid. The latter tends to fall as the length of the depression is increased and its width decreased. In general, the length of the depressions is from 0.5 to 50 cm., preferably from 1 to 20 cm. The distance between adjacent bottlenecks is approximately equal to their length and is preferably from 1 to 20 cm. The width of the slot-like depressions is, in general, between 1 and 15 mm., advantageously between 2 and 10 mm. In the case of orifice plates, the diameter of the orifice is conveniently between 5 and 20 mm., in particular between 5 and 10 mm. The optimum capillary length is equal to that of the squeezed depressions.

The polycondensation is conveniently effected in the presence of the usual polycondensation catalysts, such as antimony and germanium compounds, in the usual amounts. It may be advantageous to inactivate any transesterification or esterification catalysts which may be present such as zinc, calcium or manganese compounds, by using an organic phosphite such as triphenyl phosphite in the usual way.

A particular advantage of the process of the invention is, in contrast to many other processes known from the literature, that the condensation of diglycol terephthalate or its precondensates may be carried out continuously in a single stage, because the degree of condensation which is achieved is very high and the amount of terephthalic acid which is lost is economically tolerable. For example, using the single-stage procedure at a vacuum of from 5 to 100 mm. of Hg and product temperatures of from 260° to 280° C., a precondensate having an intrinsic viscosity of 0.13 to 0.32 is obtained when diglycol terephthalate is used as starting material, such as is obtained in the conventional transesterification of dimethyl terephthalate with ethylene glycol.

If, in the process of the invention, the starting materials used are precondensates having an intrinsic viscosity of between 0.20 and 0.30 and temperatures of from 270° to 300° C. and pressures of from 0.1 to 1.5 mm. of Hg are used, polyesters having an intrinsic viscosity of up to 0.40 are obtained.

However, it is of course possible to carry out the process in a cascade of reactors, preferably in two stages. For example, a first condensation stage may involve the production of the transesterification product at temperatures of from 260° C. to 280° C. and pressures of between 5 and 100 mm. of Hg forming a precondensate having an intrinsic viscosity of up to 0.24, this precondensate then being converted in a second stage at temperatures of from 270° to 300° C. and pressures of from 0.1 to 1.5 mm. of Hg. to polyesters having intrinsic viscosities of up to 0.40.

Of course, it would be possible, in principle, to carry out the polycondensation in a single tube. For economic reasons, however, it is convenient to use a bundle of tubes, that is a number of tubes placed side by side, for example up to 2,000 tubes, preferably from 2 to 500 tubes and more preferably from 5 to 400 tubes being used in the bundle. The number of tubes included in the bundle is governed by economic considerations. The more tubes that are used the more economical the process. The upper limit is set by the size of the apparatus required. We have found it advantageous to arrange the tubes in bundles which are substantially vertical and not horizontal, the tubes being substantially parallel to each other.

The accompanying drawing illustrates one embodiment of this kind of reactor, only a few tubes being shown for the sake of simplicity.

The apparatus for carrying out the process of the invention is conveniently composed of a bundle of sationary, heated tubes 1 surrounded by a heating jacket 2 for the accommodation of a heating medium 3, conventional means (not shown) being provided below the tubes for charging the starting material to be condensed, and means for evenly distributing the reaction mixture also being provided. Immediately above the tubes there is provided a hold tank 4 which is connected to a vacuum at the outlet 5, further conventional means for the regulation of the residence time of the reaction mixture being provided if desired, and conventional means for discharging the resulting polyester from the hold tank also being provided. It is further convenient to provide liquid-catching surfaces 6 between hold tank 4 and vacuum outlet 5. Hold tank 4 may, for example, be in the form of an overflow tank, the capacity of which determines the average residence time of the liquid.

It may, in some cases, be favorable to divide the heating jacket surrounding the bundle of tubes into two separate zones, the temperature of the heating medium in the upper zone being higher than that in the lower zone within the temperature range stated. Thus, the temperature of the heating medium in the upper zone may be from 280° to 310° C. and in the lower zone from 250° to 280° C.

In the process of the invention intrinsic viscosities of up to 0.40 may be obtained by polycondensation. The resulting polyesters may be subjected to further condensation in the usual way, for example using a reactor equipped with a screw-type stirrer at temperatures of from 270° to 290° C. and a pressure of less than 1 mm. of Hg, to form polyesters having the required intrinsic viscosity for the production of filaments, fibers or film, for example intrinsic viscosities of up to 0.60 or more.

In this way high-grade products are obtained which have a highly satisfactory color and a high melting point. Filaments, fibers or films made from these products show good physical properties after the usual drawing operations.

Conventional additives such as pigments, soluble dyes, stabilizers or antistatic agents may be incorporated in the polyesters of the invention before, during or after their manufacture.

The process of the invention and the apparatus for carrying it out are notable for their great simplicity. Thus the reactor is very cheap to produce. The throughput of reaction product may be readily increased by increasing the number of tubes in the bundle or by placing a number of bundles side by side. This is often not possible in more complicated apparatus. A very high degree of self-cleaning is achieved in the apparatus used in the process of the invention. The efficient heat transfer arising from the advantageous ratio of volume of product to heating area in the tubes reduces the necessary residence time of the polycondensate in the heated zone.

Another important advantage is the low loss of terephthalic acid achieved by simple means in the present invention comprising the special way of guiding the stream of product and its vaporous portions.

In the following example the parts and percentages are by weight.

EXAMPLE 194 parts of dimethyl terephthalate are transesterified with 124 parts of ethylene glycol in the presence of 0.015% by weight of zinc acetate based on dimethyl terephthalate during 3 hours at a temperature rising from 150° to 230° C.

This transesterification product, which substantially consists of diglycol terephthalate, excess glycol and oligomers, is continuously fed, after the addition of 0.05% by weight of antimony-III-acetate, to a bundle of seven tubes of constant cross-section by means of a metering pump. The length of the tubes is 500 cm. and their internal diameter measures 4 cm. The tubes are located in a cylinder through which diphenyl flows to heat the reaction mixture flowing through the tubes at the temperatures given in the following table.

The tops of the tubes communicate with a hold tank to which the vacua given in the following table are applied. The residence time of the product in the reactor is regulated by varying the level of the liquid in the hold tank. The product of the reaction is continuously discharged from the hold tank after overflowing. The vaporous portions are withdrawn via the vacuum outlet and condensed in a glycol cycle provided with an injection condenser. At the end of each experiment the total amount of terephthalic present in the recycle glycol in the form of diglycol terephthalate and oligomers is determined and recorded as percentage of the total amount of terephthalic acid passed through the reactor. This percentage is given in the following table as terephthalic acid loss (TPA loss). The following results are obtained.

TABLE

| Experiment number: | Throughput (kg./hr) | Capacity (kg.) | Avg. residence time (min.) | Reaction temp. (° C.) | Pressure (mm. Hg) | Intr. visc. of product | TPA loss (percent) |
|---|---|---|---|---|---|---|---|
| 1 | 27.3 | c. 28 | c. 61 | 270 | 10 | 0.252 | |
| 2 | 47.6 | 28 | 35 | 270 | 10 | 0.234 | 0.8 |
| 3 | 65.8 | 28 | 26 | 270 | 10 | 0.223 | |
| 4 | 84.0 | 28 | 20 | 270 | 10 | 0.194 | |
| 5 | 27.3 | 28 | 62 | 280 | 10 | 0.297 | |
| 6 | 46.2 | 28 | 36 | 280 | 10 | 0.259 | |
| 7 | 68.6 | 28 | 24 | 280 | 10 | 0.245 | 1.0 |
| 8 | 91.0 | 28 | 18 | 280 | 10 | 0.230 | |
| 9 | 49.3 | 46 | 57 | 270 | 50 | 0.161 | 0.25 |
| 10 | 47.6 | 43 | 54 | 270 | 20 | 0.194 | 0.4 |

The determination of the intrinsic viscosities of the polyesters if effected in each case on a 0.5% solution in a solvent mixture comprising o-dichlorobenzene and phenol in a ratio of 2:3 at 25° C.

We claim:

1. In a process for the continuous manufacture of linear polyesters containing at least 80% by weight of ethylene glycol terephthalate units and having an intrinsic viscosity of up to 0.40 by polycondensing diglycol terephthalate or its precondensates having an intrinsic viscosity of up to 0.30, the improvement which comprises:

continuously introducing a reaction mixture of said diglycol terephthalate or its precondensates having an intrinsic viscosity of up to 0.30 for flow upwardly through a bundle of stationary tubes heated at temperatures between 250° and 310° C. to a hold tank located immediately above said tubes;

maintaining a vacuum having a pressure of from 0.1 to 600 mm. of Hg above the liquid level of the reaction mixture in said hold tank and continuously removing said evaporated volatile portions with said vacuum;

supplying at least 80% of the heat required for the polycondensation reaction and for evaporating the volatile portions of the reaction mixture by means of said heated tubes, any remaining portion of the heat requirement being supplied by heated surfaces in said hold tank;

agitating the reaction mixture solely by the bubbles of vapor formed in the mixture as it passes through the tubes and into the hold tank under said vacuum, said bubbles producing surface renewal in the reaction mixture within the tubes and in the hold tank; and continuously withdrawing polycondensation product from said hold tank to provide a liquid level therein corresponding to an average residence time of the reaction mixture in the tubes and hold tank together of between 10 and 200 minutes.

2. A process as claimed in claim 1 wherein the vacuum is maintained at a pressure of 0.1 to 100 mm. of Hg.

3. A process as claimed in claim 1 wherein said residence time is from about 15 to 120 minutes.

4. A process as claimed in claim 1 wherein the initially introduced reaction mixture contains at least one other polyester-forming component in addition to diglycol terephthalate or its precondensates.

5. A process as claimed in claim 1 wherein said reaction mixture is passed upwardly through tubes of constant cross-section.

6. A process as claimed in claim 1 wherein said reaction mixture is passed upwardly through tubes of varying cross-section.

7. In a process for the continuous manufacture of linear polyesters containing at least 80% by weight of ethylene glycol terephthalate units and having an intrinsic viscosity of up to 0.40 by polycondensing diglycol terephthalate or its precondensates having an intrinsic viscosity of up to 0.30, the improvement which comprises:

continuously introducing a reaction mixture of said diglycol terephthalate or its precondensates having an intrinsic viscosity of up to 0.30 for flow upwardly through a bundle of stationary tubes heated at temperatures between 250° and 310° C. to a hold tank located immediately above said tubes;

maintaining a vacuum having a pressure of from 0.1 to 600 mm. of Hg above the liquid level of the reaction mixture in said hold tank and continuously removing said evaporated volatile portions with said vacuum;

supplying all the heat required for the polycondensation reaction and for evaporating the volatile portions of the reaction mixture by means of said heated tubes;

agitating the reaction mixture solely by the bubbles of vapor formed in the mixture as it passes through the tubes and into the hold tank under said vacuum, said bubbles producing surface renewal in the reaction mixture within the tubes and in the hold tank; and continuously withdrawing polycondensation product from said hold tank to provide a liquid level therein corresponding to an average residence time of the reaction mixture in the tubes and hold tank together of between 10 and 200 minutes.

8. A process as claimed in claim 7 wherein the vacuum is maintained at a pressure of 0.1 to 100 mm. of Hg.

9. A process as claimed in claim 7 wherein said residence time is from about 15 to 120 minutes.

10. A process as claimed in claim 7 wherein said reaction mixture is passed upwardly through tubes of varying cross-section.

References Cited
UNITED STATES PATENTS 3,466,150   9/1969   Dietze et al. _____ 23—285

MELVIN GOLDSTEIN, Primary Examiner

U.S. Cl. X.R.

23—283